Aug. 23, 1932.  J. G. HEANEY  1,872,944

SEWER ROD

Filed Oct. 22, 1928

INVENTOR.
J. G. HEANEY
BY
ATTORNEY.

Patented Aug. 23, 1932

1,872,944

UNITED STATES PATENT OFFICE

JOHN GREGORY HEANEY, OF OAKLAND, CALIFORNIA

SEWER ROD

Application filed October 22, 1928. Serial No. 314,001.

This invention relates to improvements in apparatus for cleaning out sewers, culverts and other conduits.

The invention resides in the provision of a novel and efficient "sewer rod" which is made up in sections and by use of novel coupling means forming a part of this invention, may be built up in various lengths and operated within a sewer or culvert in an easy and reliable manner to effectively remove débris and stoppage.

One of the objects of the invention is to provide in a sectional sewer rod of the character described a novel coupling device which facilitates a quick connection of the rod sections so that they will not come apart during use of the apparatus, the provision for locking the joints against unintentional uncoupling effecting a saving in time and preventing loss of rods in sewers or culverts.

A further object of the invention is to provide a sectional sewer rod of the character described which is inexpensive and which may be operated effectively in culverts and sewers of all kinds and at points or intersections of such sewers and culverts without danger of uncoupling of the joints and consequent loss of the rods.

With the above mentioned and other objects in view, the invention consists in the novel construction and combination of parts hereinafter described, illustrated in the accompanying drawing, and set forth in the claims hereto appended, it being understood that various changes in the form, proportion, size and minor details of construction within the scope of the claims may be resorted to without departing from the spirit or sacrificing any of the advantages of the invention.

Referring to the drawing.

The embodiment of the invention shown in the accompanying drawing consists of a plurality of rods 1, say for example three feet in length, which are adapted to be joined together by coupling devices 2. The farthermost coupling device carries a rod 3 projecting forwardly therefrom, the outer end of which rod is pointed and barbed similarly to an arrow head as indicated by the numeral 4. By this arrangement the barbed, pointed end may be engaged with the débris or stoppage in the sewer or culvert so that said stoppage may be withdrawn.

Figure 4:
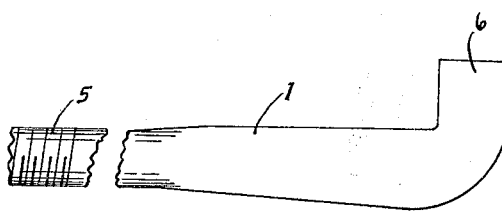
Fig. 4 represents a fragmentary top plan view of one of the rods.

Each of the rods 1 (see Fig. 4) is provided at one end with screw threads 5 and at its other end with a right angularly squared projection 6 forming as it were, a hook on this end of the rod. At the juncture of the right angular extension and rod proper is a rounded portion 7 to facilitate the insertion and removal of the rod in the coupling device.

Figure 2:
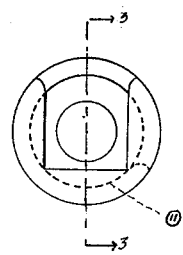
Fig. 2 represents a rear elevation of one of the coupling devices.
Figure 3:
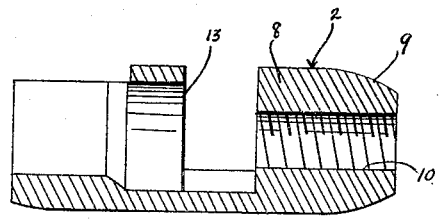
Fig. 3 represents a longitudinal sectional view of one of the coupling devices taken on the plane of line 3—3 of Fig. 2.

Each of the coupling devices (see Figs. 2 and 3) comprises a circular tubular body 8 which is slightly pointed as at 9 at its forward end and provided adjacent the forward end of its bore with screw threads 10. The screw threaded ends of the rods 1 are adapted to be turned in the screw threaded portion of the bore of the coupling member. The remaining portion of the bore of the tubular body member is enlarged and squared from one end of the tubular member to a point adjacent the center but at the central portion, the bore is rounded or curved as indicated by the numeral 11 and this rounded portion 11 of the bore is below the plane of the squared portion (see Fig. 5) to provide adequate space to insert and operate the hook end of the rod. A slot 12 extends from one end of the body portion approximately one-third the length of the body and opens the bore on one side of the body. At a point approximately centrally of the body portion is a transverse slot 13 opening into the bore, particularly the rounded part of the bore. One end of the transverse slot is in approximate alignment with one longitudinal edge of the slot 12, whereas the other end of the transverse slot is offset considerably to the right of the other longitudinal edge of the slot 12 (see Fig. 1), thereby giving a bayonet slot effect.

Figure 1:
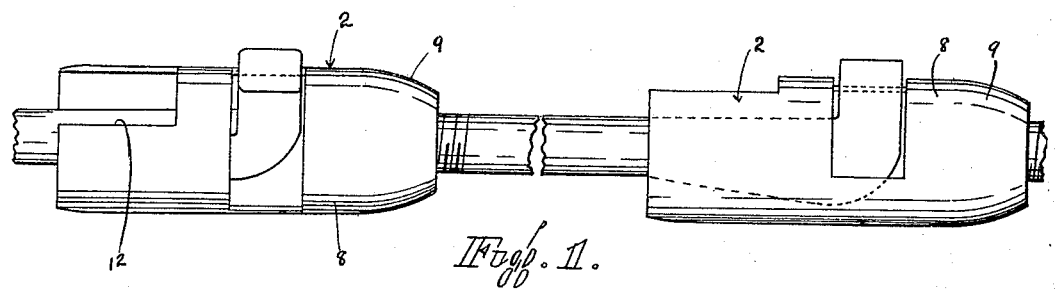
Fig. 1 represents an enlarged fragmentary side elevation of a length of sewer rod constructed in accordance with the invention, there being shown two of the coupling devices for joining sections of the rod together.
Figure 5:
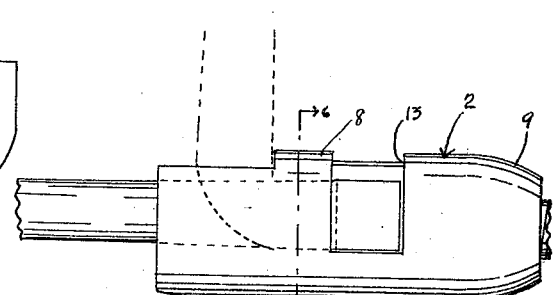
Fig. 5 represents an enlarged side elevation of one of the coupling devices showing in full lines a portion of one of the rods properly coupled therewith, and in dotted lines the position of the rod at the start of the coupling operation and as it would appear when detaching the rod from the coupling.
Figure 7:
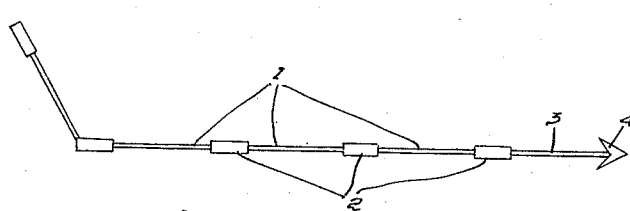
Fig. 7 represents a reduced view of a complete sewer rod as it would appear when assembled for operation within a sewer or culvert.
Figure 6:
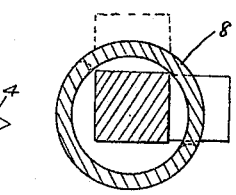
Fig. 6 represents a cross sectional view taken on the plane of line 6—6 of Fig. 5.

In the use of the sectional sewer rod, the operator makes a break through the sewer pipe or culvert at a point close as can be estimated to the stoppage, and then inserts the first section, being the one at the right hand end of the sectional rod shown in Fig. 7. This section comprises the rod 3 with one of the couplings 2 on one end and the pointed barbed member or arrow 4 on the other end. By laying this section flat in the pipe and then inserting the next section perpendicularly so that the hook end may be inserted into the squared end of the bore of the coupling device (see Fig. 5), the rounded portion 7 permits of the rocking of the second section rearward so that the projection 6 may be caused to extend upwardly through the transverse slot 13 into the position indicated by dotted lines in Fig. 6, and as shown in Fig. 1. The operator then turns the second section to the right so as to bring the projection into the right hand end of the bayonet slot, into position shown in Figs. 5 and 6. The next section is inserted in the coupling member of the second section and the addition of sections is continued until the rod may be pushed to the proper point to cause the barbed end to engage the stoppage. In pushing the sectional rod into place, it is turned to the right and by this movement, the hook ends, that is the projections 6, are maintained in locked position for when these projections 6 are engaged in the right hand ends of the slots 13 as shown in Figs. 5 and 6, the withdrawal of the sections from the coupling members cannot be effected regardless of the movement of the coupling device of the sections into various angles that might be caused by the rod encountering an obstruction within the pipe. After the stoppage has been properly engaged, the rods are pulled rearward while twisting to the right, and the stoppage may be removed in the customary manner. As each section is brought opposite the point of insertion into the pipe, it is rotated to the left to cause the hook or the projection 6 to move out of unlocked position to position shown in dotted lines in Fig. 6, and following this, the rounded end 7 permits of the lifting of the section to be moved into upright position shown in Figs. 5 and 7, whereby the hook end may be readily disconnected from the coupling device.

I claim:

1. The combination with a pair of rods to be connected together end to end, of a tubular sleeve threaded upon the end of one of said rods, said tubular sleeve having a longitudinally extending slot formed therein and opening at one of its ends, said sleeve having a transverse opening formed in its wall in longitudinal alignment with the said slot but being offset beyond one longitudinal edge of the slot to form a bayonet slot effect; a right angularly extending projection on the adjacent end of the other rod, which projection and a portion of the rod contiguous to the projection is of polygonal cross section; a portion of the bore of the sleeve being formed of a polygonal cross section to fit over said projection and polygonal rod portion only when the latter are aligned with the slot, and the bore being enlarged opposite the transverse opening to accommodate the bent portion of the rod at the projection as the rod is inserted and removed.

2. The combination with a pair of rods, a right angular projection on the end of one rod, said projection and a portion of the rod contiguous therewith being of polygonal cross section; of a tubular sleeve secured to the adjacent end of the other rod, said sleeve having a longitudinal slot extended longitudinally from its ends and having a transverse opening formed in its wall spaced in longitudinal alignment from the end of the slot, but being offset beyond a longitudinal edge of the slot to form a bayonet slot effect; a portion of the bore at said slot being of polygonal cross section to fit said projection and said polygonal rod portion only when said projection is in alignment with said slot.

JOHN GREGORY HEANEY.